United States Patent [19]
Irie et al.

[11] 3,748,903
[45] July 31, 1973

[54] FLOW METER HAVING VERTICAL ROTOR SHAFTS

[75] Inventors: Yoshihiko Irie, Kawasaki; Mahiko Kato, Tokyo; Kiyondo Gomi, Yokohama, all of Japan

[73] Assignee: Tokico Ltd., Kawasaki-City, Japan

[22] Filed: Aug. 4, 1971

[21] Appl. No.: 168,829

[30] Foreign Application Priority Data
Apr. 10, 1971 Japan.............................. 46/22420

[52] U.S. Cl.................................. 73/261, 418/133
[51] Int. Cl. .............................................. G01f 3/08
[58] Field of Search...................... 73/261; 418/133, 418/206; 308/9

[56] References Cited
UNITED STATES PATENTS
| | | | |
|---|---|---|---|
| 1,233,599 | 7/1917 | Nuebling............................. | 73/261 |
| 386,795 | 7/1888 | Ball..................................... | 73/261 |
| 1,996,672 | 4/1935 | Busch.................................. | 73/261 |
| 3,110,525 | 11/1963 | Sternlight............................ | 308/9 |
| 3,121,330 | 2/1964 | Leslie et al. ........................ | 309/9 |

*Primary Examiner*—Herbert Goldstein
*Attorney*—Eric H. Waters et al.

[57] ABSTRACT

A flow meter has vertically disposed rotor shafts which rotate integrally with rotors responsive to the flow quantity of a fluid. The shafts are supported, on one hand, by thrust bearings which pivotally receive vertical shaft loads due to the weights of the rotors and shafts and supported, on the other hand, by radial bearings which receive transverse shaft loads due to the rotation of the rotors and the shafts caused by the differential pressure of the fluid. The rotors and the shafts receive an upwardly acting force due to the differential pressure between inlet and outlet passages, and whereby the vertical shaft loads due to their weights are reduced.

5 Claims, 6 Drawing Figures

FLOW METER HAVING VERTICAL ROTOR SHAFTS

This invention relates to a flow meter and more particularly to a positive displacement type flow meter having vertical rotor shafts.

A positive displacement type flow meter is generally used for measuring flow quantity of a fluid by rotation of rotors, utilizing a space or measuring space formed between the rotors and the inner housing in the casing. Accordingly, the quantity of leakage from between the rotors and the inner housing has an influence on the value of instrumental error. If this quantity of leakage is small, an accurate measurement can be achieved even when the flow quantity is low. Therefore, in order to improve the instrumental error in the low flow quantity, the quantity of leakage should be reduced to the minimum. For this purpose, it is important that rotational resistance of the rotors during their rotations should be minimized.

In a conventional positive displacement type flow meter, rotor shafts which rotate integrally with the rotors are arranged horizontally so that sliding resistance between the side surfaces of the rotors and the side plates in the casing will be reduced. The following method have been adopted to improve the instrumental error in the low flow quantity of this conventional flow meter having the horizontal shafts: (1) The gap between the rotors and the inner housings are made as small as possible. (2) The rotational resistance which the rotor receives is reduced by employing a light alloy such as aluminum alloy as the material for the rotors so as to reduce a bearing load or by employing ball bearings as the bearings for the rotors so as to reduce rotational resistance of the bearings.

It is generally observed that there are usually some scales in fluid, which scales cannot be completely removed by a streiner. Accordingly, the conventional flow meter in which the above described method (1) is adopted is disadvantageous in that the extremely small gap between the rotors and the inner housings causes the scales to block the gaps between the rotors and the inner housings, thereby making the rotation of the rotors unstable and injuring the side surfaces of both rotors and the inner housings resulting in decrease in the durability of the flow meter. The conventional flow meter in which the above described method (2) is adopted is also disadvantageous in that if a light alloy such as aluminum alloy is used as the material of the rotors, the flow meter cannot be used for measuring a corrosive fluid such as a chemical agent because the rotors will be corroded by the fluid. The kinds of fluids which can be measured by such flow meter are therefore limited. Furthermore, if ordinary ball bearings made of steel are used as the bearings for the shafts, the ball bearings are worn away in a relatively short period due to their engagement with the scales. Moreover, these ball bearings cannot be used for corrosive fluids.

The conventional horizontal type flow meter has the rotor shafts disposed horizontally and journalled by the horizontal radial bearings at positions adjacent to both ends thereof. Due to this construction, the bearings receive a shaft load applied by the shafts when the rotors are rotated by the differential pressure of the fluid in addition to a load applied due to weights of the rotors and the shafts. As a result, the bearings are worn on one side only and therefore wear repidly and their life is relatively short. This will present a serious problem particularly in the case wherein the fluid to be measured is one which is poor in a lubricative nature.

It is, therefore, a general object of the invention to provide a novel and useful flow meter eliminating the above described disadvantages of the conventional horizontal type flow meter.

Another object of the invention is to provide a vertical type flow meter in which rotor shafts rotating integrally with rotors are disposed vertically relative to a horizontal plane. According to the vertical type flow meter made in accordance with the present invention, rotation resistance which the rotors receive during their rotations is so small that an accurate measurement of the flow quantity can be achieved even when the quantity to be measured is small and the instrumental error is extremely reduced. Accordingly, measurement in a low flow quantity is made possible, whereby the range in which measurement is practicably possible is enlarged. The shaft loads applied in a vertical direction due to the weights of the rotors and the shafts are carried by thrust bearings, whereas the shaft loads in a horizontal direction produced when the rotors are rotated by the differential pressure are carried by radial bearings. Therefore the shaft loads are divided and durability of the bearings is improved. Further, due to the vertical arrangement of the shafts, a counter section to which rotation of the shaft is transmitted can be mounted on the upper part of the casing of the flow meter. Accordingly, space can be saved in the piping of the flow meter.

A further object of the invention is to provide a flow meter having vertically disposed rotor shafts in which the shaft loads applied in a vertical direction due to the weights of the rotors and shafts are reduced by utilizing the differential pressure between the inlet passage side and the outlet passage side of the flow meter. According to this flow meter, the rotation resistance of the rotor shaft and the bearing is further reduced. The instrumental error in the low flow quantity is further reduced and the life of the flow meter is prolonged.

A still further object of the invention is to provide a flow meter which is possessed with high anticorrosion and antiwearing characteristics by using a special super hard alloy as the material of the bearings for the rotor shafts.

Other objects and features of the invention will become apparent from the description made hereinbelow with reference to the accompanying drawings, in which.

Figure 1:
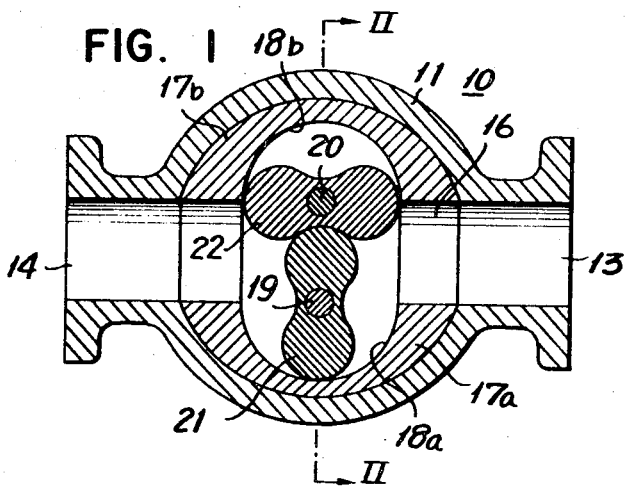
FIG. 1 is a cross-sectional plan view of one embodiment of the flow meter according to the invention.
Figure 2:
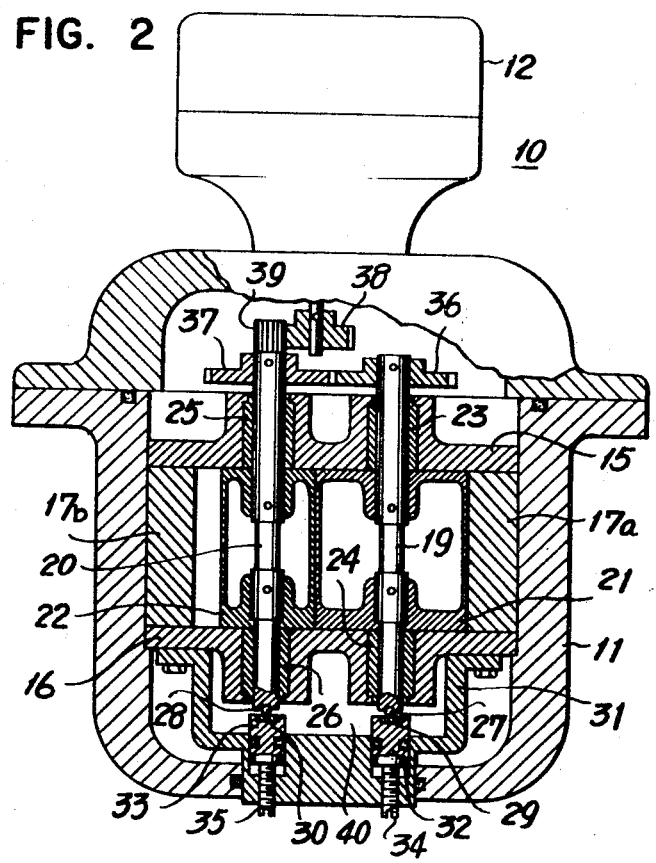
FIG. 2 is a side elevational view of the flow meter taken along the line II—II of FIG. 1 partly shown in a vertical section.

The first embodiment of the flow meter according to the invention will be described with reference to FIGS. 1 and 2. A flow meter designated by reference numeral 10 generally consists of a casing 11 and a counter part 12 mounted on the top thereof. On both sides of the casing 11, there are provided an inlet passage 13 and an outlet passage 14. An upper inner casing side plate 15 and a lower inner casing side plate 16 are fixedly mounted to the casing 11, vertically spaced apart from each other by a predetermined distance and defining a fluid passage. Inner housings 17a and 17b having semicircular sections 18a and 18b respectively are fixedly mounted between the upper side plate 15 and the lower side plate 16 within the casing 11. It is to be noted that the flow meter 10 in the present embodiment is installed and used in a state in which its cross-section including the inlet passage 13 and the outlet passage 14 is in a horizontal plane.

Rotors 21 and 22 fixed respectively to rotor shafts 19 and 20 are rotatably disposed within a space defined by the upper side plate 15, lower side plate 16 and inner housings 17a and 17b. The upper side plate 15 and the lower side plate 16 are respectively provided with sliding bearings or radial bearings 23, 25 and 24, 26 made of carbon or the like material. The shafts 19 and 20 are respectively supported by the radial bearings 23, 24 and 25, 26 vertically with respect to the horizontal plane and thereby prevented from transverse vibrations.

The lower ends of the shafts 19 and 20 are respectively pivotally supported by thrust bearings 29 and 30 through ball bearings 27 and 28. As the material for the lower portion of the shafJs 19 and 20, ball bearings 27 and 28 and thrust bearings 29 and 30, super hard alloys such as tungusten carbide and chrome carbide which have high anticorrosion and antiwearing characteristics should preferably be used. A support member 31 is fixedly mounted at its upper end to the lower surface of the lower side plate 16 and has its lower portion fitted in an opening of the casing 11 in a watertight manner. Bearing assemblies 32 and 33 having the thrust bearings 29 and 30 at the upper portions thereof are in threaded engagement at their threaded portions 34 and 35 with the support member 31. The bearing assemblies 32 and 33 are in a watertight engagement with the support member 31 and are capable of sliding vertically slightly relative thereto.

A fluid to be measured enters a chamber 40 formed between the lower side plate 16 and the support member 31 through the clearances between the shafts 19 and 20 and the radial bearings 24 and 26. Consequently, the bearings 27, 28, 29 and 30 are used in the fluid with the result that frictional resistance at the bearings is reduced.

Pilot gear wheels 36 and 37 are mounted on the upper end portions of the shafts 19 and 20. The pilot gear wheels 36 and 37 are in meshing engagement with each other, whereby rotors 21 and 22 are rotated in association with each other. A toothed portion 39 fixedly mounted on the upper end of the shaft 20 meshes with a gear 38. The rotation of the shafts 19 and 20 are transmitted to the gear 38 and then to a countr in the counter part 12. It will be noted that the abovementioned pilot gear wheels are unnecessary if oval gear wheels are used as the rotors.

The operation of the flow meter 10 having the above described construction will be described.

When the fluid to be measured flows into the inlet passage 13, the rotors 21 and 22 are rotated due to the differential pressure of the fluid between the inlet passage 13 and the outlet passage 14. At each rotation of the rotors 21 and 22, predetermined quantity of the fluid is sent out to the outlet passage. The roations of the rotors 21 and 22 are transmitted to the counter provided in the counter part 12 through the shaft 20, the toothed portion 39 and the gear wheel 38, operating the counter to make the measuring of the flow quantity.

The shafts 19 and 20 are respectively supported by the bearings 23, 24, 25 and 26 in a transverse direction and by the bearings 29 and 30 only in a vertical direction. The vertical shaft load including the self weights of the rotor 21 or 22 and the shaft 19 or 20 is carried by the single bearing 29 or 30. Further, the insertion of the ball bearings 27 and 28 between the lower end portions of the shafts 19 and 20 and the bearings 29 and 30 serves to minimize the areas of the shafts 19 and 20 which are in contact with the thrust bearings 29 and 30. Accordingly, the frictional resistance which the shafts 19 and 20 receive during their rotations is extremely small. The shaft load carried by the bearings 23, 24, 25 and 26 is only a load applied in a transverse direction due to the differential pressure of the fluid during rotation of the rotors 21 and 22, and not the load including the self weights of the rotors 21 and 22 etc. Accordingly, the shaft load is extremely reduced as compared with the conventional flow meter in which the shafts of the rotors are horizontally supported.

Due to reduction in the areas of the shafts 19 and 20 which are in contact with the bearings 29 and 30 and accompanying reduction in the rotational resistance combined with reduction in the shaft load carried by the bearings 23 to 26, the shafts 19 and 20 and the rotors 21 and 22 can be easily rotated by a small differential pressure. Accordingly, the flow meter according to the invention has eliminated the disadvantages in the conventional flow meter that the rotors 21 and 22 are not rotated or rotated with difficulty when there is only a small differential pressure between the inlet passage 13 and the outlet passage 14 due to the low flow quantity with the result that the fluid leaks through the gap between the rotors 21 and 22 or the gaps between the rotors 21, 22 and the inner housings 17a, 17b. Therefore, the flow meter according to the invention is capable of measuring the flow quantity accurately with a minimum instrumental error particularly when the flow quantity is low, which is an achievement the conventional flow meter failed to make.

Figure 5:
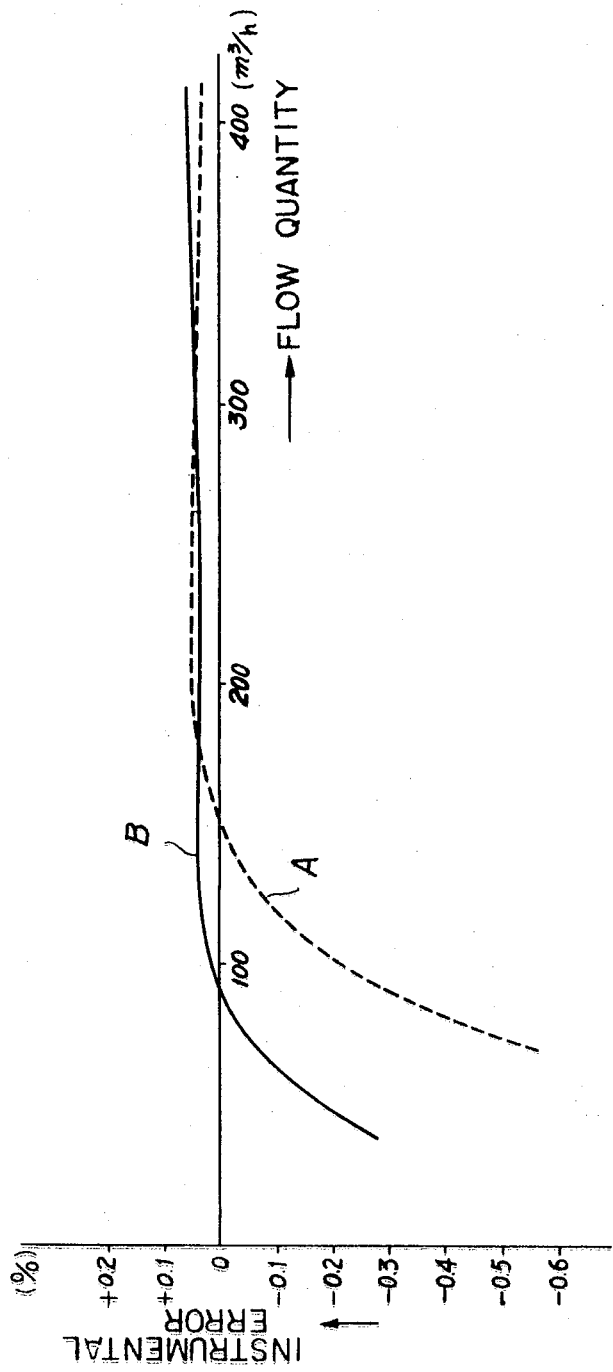
FIG. 5 is a graphical diagram showing a flow quantity — instrumental error characteristic.

The instrumental error characteristics relative to flow quantity of the conventional flow meter and the flow meter according to the invention are shown in FIG. 5. In the diagram, the curve A represents the flow quantity — instrumental error characteristic of the conventional horizontal type flow meter in which the rotor shafts are horizontally journalled. The curve B represents the flow quantity — instrumental error characteristic of the flow meter according to the invention in which the rotor shafts are vertically arranged. As it will be apparent from the diagram, the instrumental error when the flow quantity is low is large in the conventional flow meter shown by the curve A. Whereas, in the flow meter according to the invention shown by the curve B, the instrumental error particularly at the low flow quantity is much improved compared with the conventional flow meter.

Figure 3:
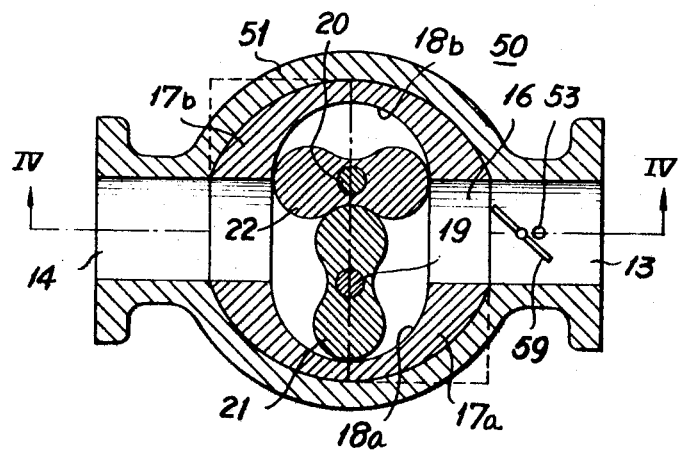
FIG. 3 is a cross-sectional plan view of another embodiment of the flow meter according to the invention.
Figure 4:
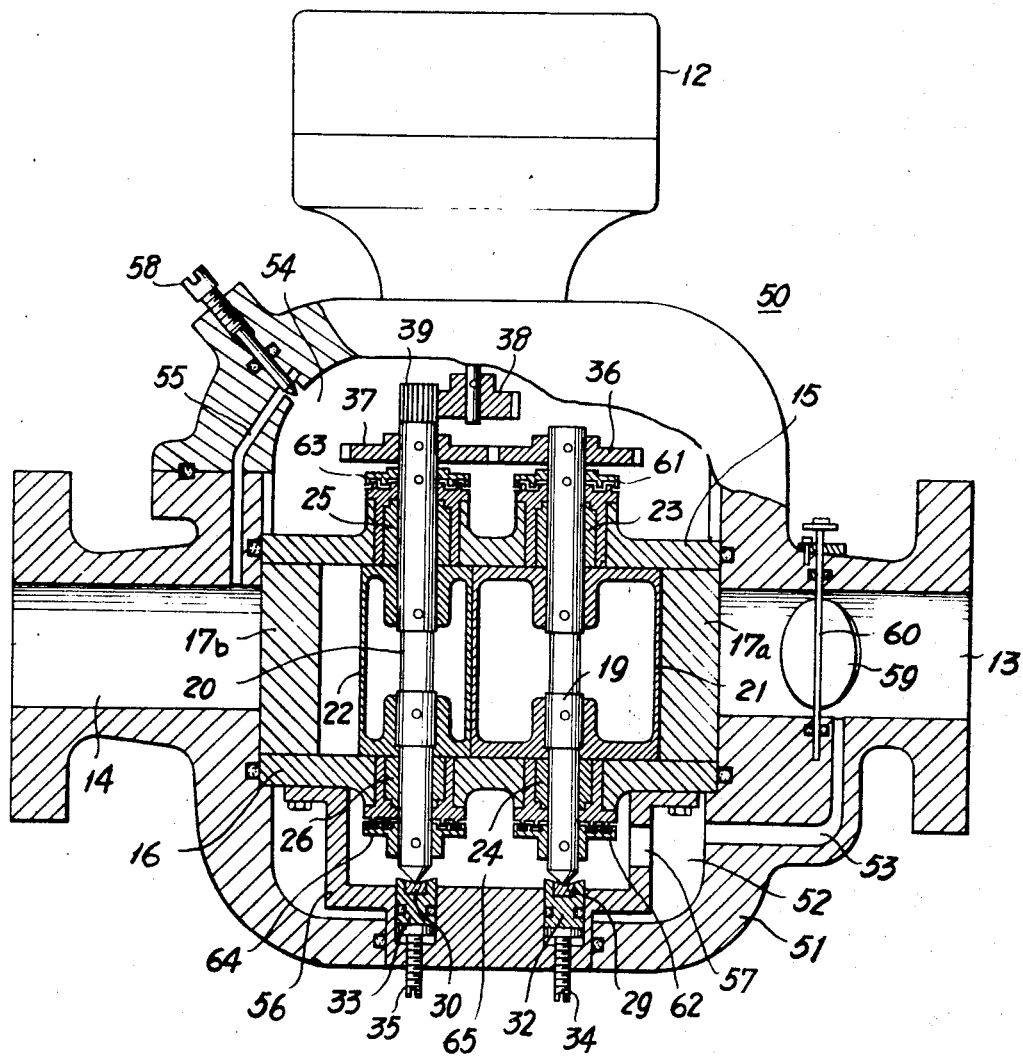
FIG. 4 is a side elevational view of the flow meter taken along the line IV—IV of FIG. 3 partly shown in a vertical section.

Nextly, the second embodiment of the flow meter according to the invention will be described with reference to FIGS. 3 and 4. Throughout FIGS. 1 to 4, the same component part is designated by the same reference numeral and the description thereof will be omitted.

A flow meter 50 generally consists of a casing 51 and the counter part 12. The casing 51 is formed with a passage 53 of a small diameter which connects the inlet passage 13 and a lower chamber 52 defined by the casing 51 and the lower side plate 16. The casing 51 is also formed with a passage 55 of a small diameter which connects the outlet passage 14 and an upper chamber 54 defined by the casing 51 and the upper side plate 15.

A support member 56 having an opening 57 on one side thereof is fixedly mounted at its upper end to the lower surface of the lower side plate 16 and has its lower portion fitted in an opening formed in the casing 51 in a watertight manner. A chamber 65 in the support member 56 is communicated with the inlet passage 13 through the passage 53, the lower chamber 52 and the opening 57, and is filled with the fluid. The upper chamber 54 is communicated with the outlet passage 14 through the passage 55 and is filled with the fluid.

At a position adjacent to the mouth of the passage 55 opening to the upper chamber 54, there is provided an adjusting screw 58 for adjusting the area of the mouth. The screw 58 can be rotated from outside of the casing 51 for its adjustment. An auxilliary plate 59 for producing differential pressure is provided within the inlet passage 13. The auxilliary plate 59 is adjustable by rotating an adjuster 60 mounted to the auxilliary plate 59. At the upper ends of bearings 23 and 25 and the lower ends of bearings 24 and 26, there are respectively provided labyrinth packings 61, 63 and 62, 64 for preventing leakage of the fluid.

The arrangement of rotors 21 and 22 and shafts 19 and 20 is the same as in the first embodiment described above. Namely, the rotors 21 and 22 and the shafts 19 and 20 are vertically disposed, being supported by the bearings 23 and 26 relative to a load applied in a transverse direction and pivotally supported by bearings 29 and 30 relative to a load applied in a vertical direction. In this embodiment, the lower ends of the shafts 19 and 20 are tapered in the form of a pivot and are directly supported by the bearings 29 and 30. However, the construction embodying the invention is not limited to this, but ball bearings may be inserted between the shafts 19 and 20 and the bearings 29 and 30 in the same manner as in the first embodiment.

Figure 6:
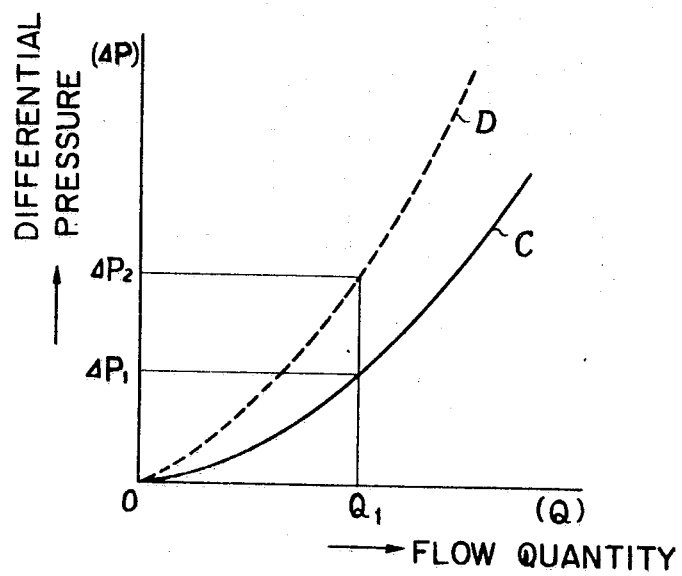
FIG. 6 is a graphical diagram showing a flow quantity — differential pressure characteristic.

The operation of the flow meter 50 having the above described construction will now be described. When the fluid to be measured enters the inlet passage 13, the rotors 21 and 22 are rotated due to the differential pressure of the fluid between the inlet passage 13 and the outlet passage 14 produced by the rotational resistance of the rotors 21 and 22 during their rotations. The flow quantity — differential pressure characteristic in this state is shown in FIG. 6. The flow quantity — differential pressure characteristic when the auxilliary plate 59 for producing differential pressure is adjusted to a position in which the resistance of the plate 59 to the fluid flowing through the inlet passage 13 is at the minimum is shown by the curve C in the diagram.

Let it be assumed that the differential pressure between the inlet passage 13 and the outlet passage 14 is $\Delta P_1$ when the flow quantity is $Q_1$. The pressure of the fluid in the inlet passage 13 is transmitted to the chamber 65 in the support member 56 through the passage 53, the lower chamber 52 and the opening 57, whereas the pressure in the outlet passage 14 is transmitted to the upper chamber 54 through the passage 55. Accordingly, the fluid pressure in the chamber 65 is equal to that in the inlet passage 13 and the fluid pressure in the chamber 54 is equal to that in the outlet passage 14. Therefore, the fluid pressure in the chamber 54 is lower than that in the chamber 65 by $\Delta P_1$.

For this reason, an upwardly acting vertical force is applied to the horizontal effective area of the shafts 19 and 20 and the labyrinth packings 62 and 64, and the rotors 21 and 22 and the shafts 19 and 20 receive the force which pushes them upwardly.

The upwardly acting vertical force $f_1$ becomes $$f_1 = a\eta \Delta P_1 \tag{1}$$

where,
$a$ = effective area of the rotor 21 (22) and the labyrinth packing 62 (64)
$\eta$ = labyrinth effect
$\Delta P_1$ = differential pressure between the chamber 65 and the chamber 54.

Also, the shaft load applied to the bearing 29 (30) $W_2$ becomes $$W_2 = W_1 - f_1 = W_1 - a\eta \Delta P_1 \tag{2}$$

where,
$W_1$ = total weight of the rotor 21 (22) and the shaft 19 (20).

Namely, the vertical shaft load applied to the bearings 29 (30) is smaller than the total weight $W_1$ by the force $f_1$ produced due to the differential pressure.

If it is desired to further decrease the shaft load applied to the bearing 29 (30), the auxilliary plate 59 for producing the differential pressure is adjusted. When the auxilliary plate 59 is rotated by means of the adjuster 60 by a desired angle, the resistance in the fluid passage in the inlet passage 13 increases. The flow quantity — differential pressure characteristic in this state is shown by the curve D in FIG. 6. It will be seen that at the flow quantity $Q_1$, the differential pressure becomes $\Delta P_2$, the differential pressure increasing further by ($\Delta P_2 - \Delta P_1$) by the rotation of the plate 59. The shaft load $W_2'$ carried by the bearing 29 (30) in this state is expressed, as in the above described equation (2), $$W_2' = W_1 - a\eta \Delta P_2 \tag{3}$$

Accordingly, the shaft load $W_2'$ can be made a very small value by selecting the effective area $a$ and the differential pressure $\Delta P_2$ at suitable values.

If the lower end portions of the shafts 19 and 20 and the bearings 29 and 30 are gradually worn away and the lower surfaces of the rotors 21 and 22 are caused to slide against the upper surface of the lower plate 16, the resistance which the rotors receive during rotation increases with a resultant increase in the differential pressure $\Delta P$. On the other hand, the increase in the differential pressure $\Delta P$ increases the upwardly acting vertical force applied to the rotors 21 and 22. Accordingly, the rotors 21 and 22 receive a force which acts in a direction to push the rotors 21 and 22 upwardly, thereby separating the lower surfaces thereof away from the upper surface of the lower plate 16. Consequently, the increase in the rotational resistance is suppressed under the influence of the differential pressure even in the foregoing state.

In the case wherein the lower end portions of the shafts 19 and 20 and the bearings 29 and 30 are worn to such a degree that the above described balance due to the rotational resistance and the differential pressure can no longer be maintained, threaded portions 34 and 35 are rotated from outside of the casing 51 so that the positions of the shafts 19 and 20 and the rotors 21 and 22 will be adjusted to a height at which they are properly supported by the bearings.

While the invention has been described with respect to specific embodiments, various modifications and variations thereof will be apparent to those skilled in the art without departing from the scope of the invention which is set forth in the appended claims.

What we claim is:

1. A flow meter comprising: a casing having an inlet passage and an outlet passage at both sides thereof; an upper side plate and a lower side plate provided in said casing and defining a fluid passage which forms a horizontal flow passage together with the inlet and outlet passages, said upper side plate and the casing defining an upper chamber, and said lower side plate and the casing defining a lower chamber; means for introducing fluid in the flow passage into the upper and lower chamber; rotor shafts arranged in a direction vertical to the horizontal flow passage including the fluid passage and the inlet and outlet passages, said shafts penetrating through the upper and lower side plates; rotors fixedly mounted on said shafts and having a plane of rotation in a horizontal plane, said rotors rotating with the shafts in the fluid passage; an inner housing defining side surfaces of a space in which said rotors rotate; thrust bearing mounted on the casing side under the lower side plate and pivotally supporting the lower ends of said shafts; radial bearings mounted respectively on said upper side plate and said lower side plate and supporting said shafts with respect to a transverse load; a counter section provided on the casing; and means including gears provided in the upper chamber, said means transmitting rotations of the shafts to the counter section, said introducing means comprising a first passage communicating said inlet passage with said lower chamber and a second passage communicating said outlet passage with said upper chamber, said shafts receiving an upwardly acting vertical force by the differential pressure between the fluid pressure in said lower chamber which is equal to the fluid pressure in said inlet passage and the fluid pressure in said upper chamber which is equal to the fluid pressure in said outlet passage, whereby a shaft load acting in a vertical direction due to the weights of said rotors and shafts is reduced.

2. The flow meter as claimed in claim 1, comprising a resisting member provided in said inlet passage of the casing and imparting resistance to the fluid to be measured which flows through said inlet passage and means for variably adjusting the resistance to the fluid in accordance with its rotated position thereby adjusting the differential pressure of the fluid between said lower chamber and said upper chamber.

3. The flow meter as claimed in claim 1 comprising means for adjusting an area of a mouth of said second passage opening to said upper chamber.

4. The flow meter as claimed in claim 1, comprising a support member provided in said lower chamber with a portion thereof being fitted in said casing and mounting said thrust bearings thereon, said support member being formed with an opening for introducing the fluid pressure of said lower chamber into a chamber formed within said support member.

5. The flow meter as claimed in claim 1, comprising labyrinth packings respectively mounted on the lower portions and upper portions of said shafts within said lower chamber and said upper chamber, said labyrinth packings respectively receiving the fluid pressures in the lower chamber and the upper chamber.

* * * * *